US009218236B2

(12) United States Patent
Vilela et al.

(10) Patent No.: US 9,218,236 B2
(45) Date of Patent: *Dec. 22, 2015

(54) ERROR SIGNAL HANDLING UNIT, DEVICE AND METHOD FOR OUTPUTTING AN ERROR CONDITION SIGNAL

(71) Applicant: Infineon Technologies AG, Neubiberg (DE)

(72) Inventors: Antonio Vilela, Mering (DE); Andre Roger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 400 days.

This patent is subject to a terminal disclaimer.

(21) Appl. No.: 13/662,846

(22) Filed: Oct. 29, 2012

(65) Prior Publication Data

US 2014/0122942 A1     May 1, 2014

(51) Int. Cl.
     *G06F 11/07*            (2006.01)

(52) U.S. Cl.
     CPC ........ *G06F 11/0793* (2013.01); *G06F 11/0739* (2013.01); *G06F 11/0757* (2013.01)

(58) Field of Classification Search
     CPC . A61B 5/746; G06F 11/0739; G06F 11/1048; G06F 11/0757; G06F 21/554
     USPC ............................. 714/48; 701/31.4; 340/501
     See application file for complete search history.

(56) References Cited

U.S. PATENT DOCUMENTS

| | | | |
|---|---|---|---|
| 6,484,082 B1 | 11/2002 | Millsap et al. | |
| 7,113,860 B2 * | 9/2006 | Wang | 701/93 |
| 7,325,162 B2 * | 1/2008 | Weddle et al. | 714/24 |
| 8,786,424 B2 * | 7/2014 | Vilela et al. | 340/501 |
| 2002/0012325 A1 | 1/2002 | Kikkawa et al. | |
| 2006/0053331 A1 * | 3/2006 | Chou et al. | 714/2 |
| 2006/0276947 A1 * | 12/2006 | Kaita et al. | 701/48 |
| 2008/0183604 A1 * | 7/2008 | Chou | 705/30 |
| 2011/0046844 A1 | 2/2011 | Honner et al. | |
| 2011/0123067 A1 * | 5/2011 | Podilchuk | 382/103 |
| 2012/0106446 A1 | 5/2012 | Yousefi et al. | |
| 2013/0198565 A1 * | 8/2013 | Mancoridis et al. | 714/26 |
| 2013/0201817 A1 * | 8/2013 | Jiang et al. | 370/217 |

(Continued)

FOREIGN PATENT DOCUMENTS

| CN | 1109985 A | 10/1995 |
|---|---|---|
| CN | 101779193 A | 7/2010 |

(Continued)

OTHER PUBLICATIONS

U.S. Appl. No. 13/397,035, filed Feb. 15, 2012.

(Continued)

*Primary Examiner* — Loan L. T. Truong

(74) *Attorney, Agent, or Firm* — Eschweiler & Associates, LLC

(57) ABSTRACT

An error signal handling unit includes an error handler configured to receive an error signal indicating an error condition. The error handler is further configured to receive a recovery signal indicating a mitigation of the error condition or indicating that a mitigation of the error condition is possible. Furthermore, the error handler is further configured to output an error condition signal based on the error signal in response to a reception of the error signal if within a given delay time from the reception of the error signal, the error handler does not receive the recovery signal, and otherwise omit outputting the error condition signal.

33 Claims, 4 Drawing Sheets

(56) References Cited

U.S. PATENT DOCUMENTS

| | | | |
|---|---|---|---|
| 2013/0207800 A1* | 8/2013 | Vilela et al. | 340/501 |
| 2013/0326263 A1* | 12/2013 | Alameldeen et al. | 714/6.2 |
| 2014/0092997 A1* | 4/2014 | Zhou et al. | 375/240.27 |

FOREIGN PATENT DOCUMENTS

| | | |
|---|---|---|
| CN | 101853192 A | 10/2010 |
| JP | 1986106657 | 7/1986 |
| JP | 2002250248 A | 9/2002 |

OTHER PUBLICATIONS

English Translation of Korean Office Action dated Jun. 19, 2014 in parallel Korean application No. 2013-0016608.

Ex Parte Quayle Office Action dated Nov. 8, 2013 for U.S. Appl. No. 13/397,035. 13 Pages.

Notice of Allowance U.S. Appl. No. 13/397,035 dated Mar. 18, 2014.

\* cited by examiner

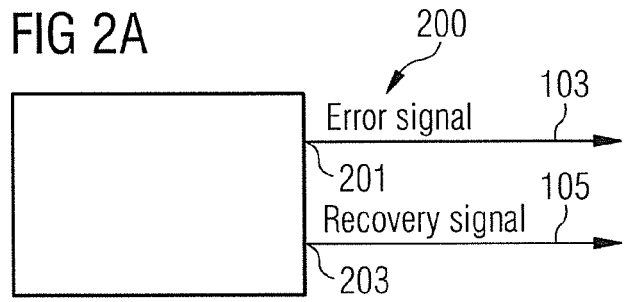
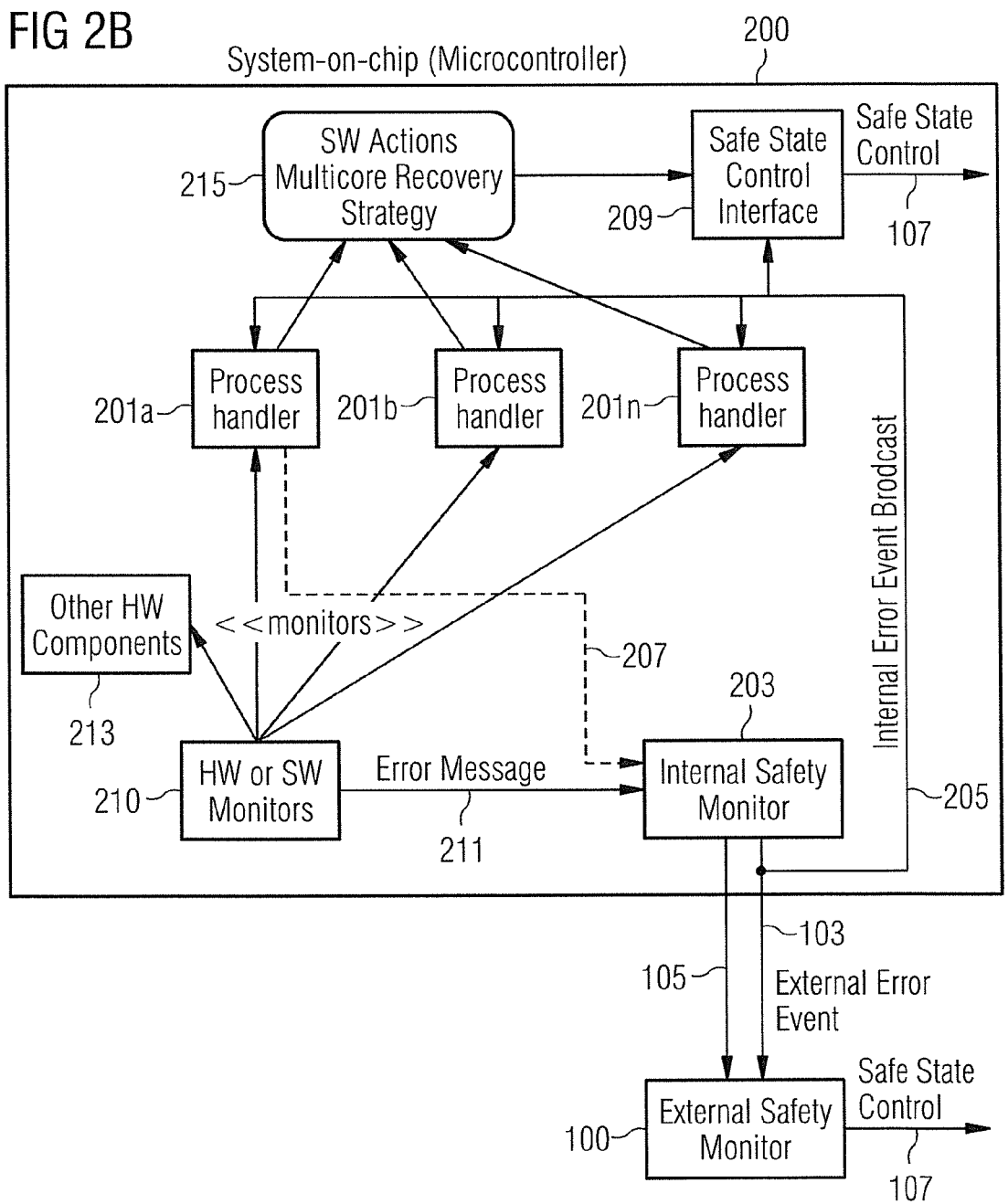

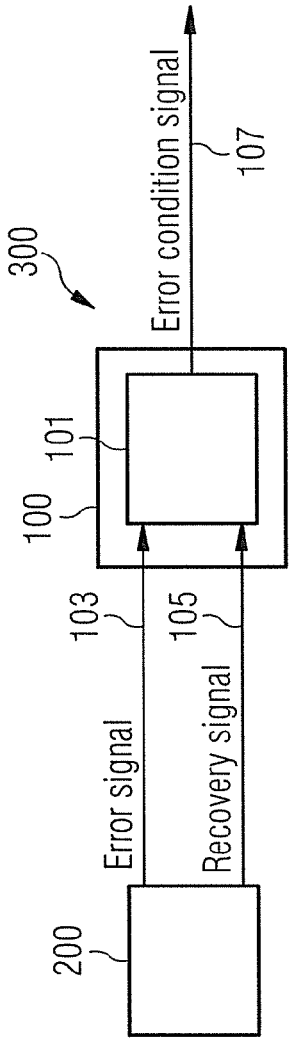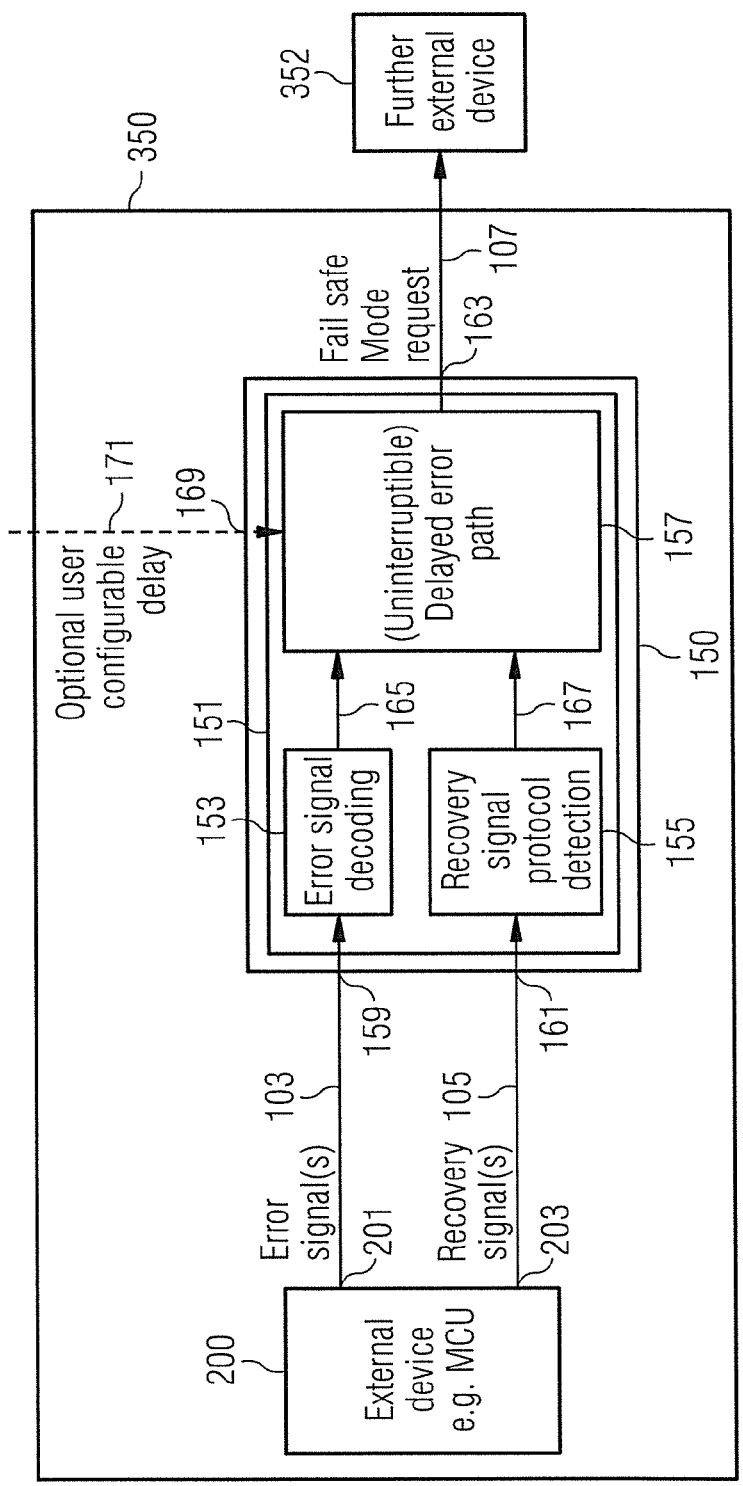

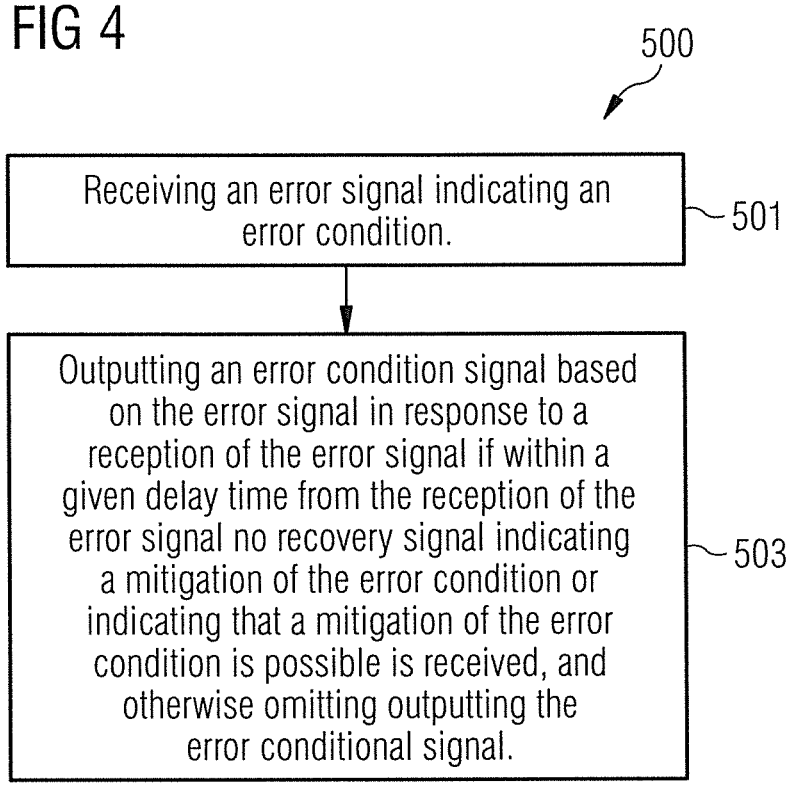

ERROR SIGNAL HANDLING UNIT, DEVICE AND METHOD FOR OUTPUTTING AN ERROR CONDITION SIGNAL

FIELD

Embodiments of the present invention relate to an error signal handling unit. Further embodiments of the present invention relate to a device configured to output in response to an error condition in the device an error signal. Further embodiments of the present invention relate to a method for outputting an error condition signal.

BACKGROUND

Modern automotive ECUs (ECU—Electrical Control Unit) will integrate more and more functionality. This trend is driven by the technology scaling on one side, enabling a high level of integration and by the highly cost driven nature of the automotive industry that forces to reduce the total number of ECUs per car. Electronics play an increasing role in providing advanced driving assistance functions and especially in preventing hazards that will reduce the number of fatal injuries.

The integration of functions inside an ECU is mainly concentrated around a multi-CPU microcontroller that plays a critical role by hosting the critical computation and control functions. Such a microcontroller can be seen as a cluster of computation nodes with defined and encapsulated tasks. Under such assumptions failure isolation is a main concern to address since it influences all the building blocks of the safety architecture.

The key issue with the growing complexity of the automotive ECU and with the focus on ISO26262 is that automotive ECUs shall be able to provide uninterrupted service, not only for a minor error but also for errors classified as critical today.

SUMMARY

Embodiments of the present invention relate to an error signal handling unit comprising an error handler configured to receive an error signal indicating an error condition. Furthermore, the error handler is further configured to receive a recovery signal indicating a mitigation of the error condition or indicating that the mitigation of the error condition is possible. Furthermore, the error handler is further configured to output an error condition signal based on the error signal in response to a reception of the error signal if within a given delay time from the reception of the error signal, the error handler does not receive the recovery signal, and otherwise omit outputting the error condition signal.

Further embodiments of the present invention relate a device configured to output in response to an error condition in the device an error signal indicating an error condition and output, in response to a mitigation of the error condition or if a mitigation of the error condition is possible, a recovery signal indicating the mitigation or the possibility of mitigation of the error condition.

Further embodiments of the present invention relate to an error signal handling system comprising such device and such error signal handling unit.

BRIEF DESCRIPTION OF THE FIGURES

Embodiments of the present invention will be described using the accompanying figures, in which:

FIG. 2a shows a block schematic diagram of a device according to an embodiment of the present invention;

FIG. 2b shows an example implementation of the device from FIG. 2a together with the error signal handling unit from FIG. 1a;

FIG. 3a shows a block schematic diagram of an error signal handling system according to an embodiment of the present invention;

FIG. 3b shows a block schematic diagram of an error signal handling system according to a further embodiment of the present invention; and FIG. 4 shows a flow diagram of a method according to an embodiment of the present invention.

DETAILED DESCRIPTION

Before embodiments of the present invention will be described in more detail using the accompanying figures, it is to be pointed out that the same or functionally equal elements are provided with the same reference numbers and that a repeated description of elements provided with the same reference numbers is omitted. Hence, descriptions provided for elements having the same reference numbers are mutually exchangeable.

Figure 1A:
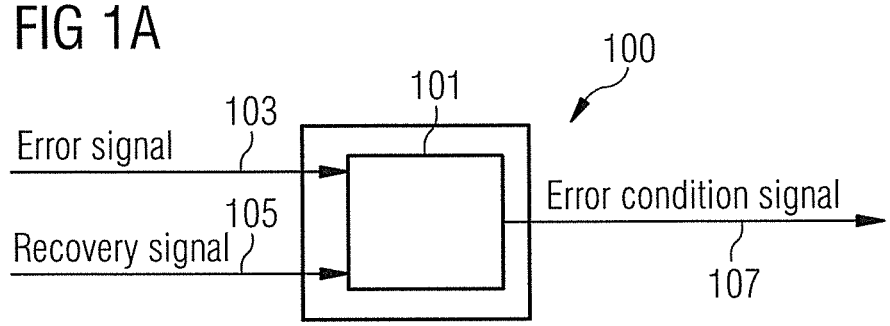
FIG. 1a shows a block schematic diagram of an error signal handling unit according to an embodiment of the present invention.

FIG. 1a shows a block schematic diagram of an error signal handling unit 100 according to an embodiment of the present invention. The error signal handling unit 100 comprises an error handler 101 (e.g. a circuitry 101) which is configured to receive an error signal 103 (e.g. from an external device or a software process—not shown in FIG. 1a), wherein the error signal 103 indicates an error condition (e.g. in the external device or the software process).

Furthermore, the error handler 101 (the circuitry 101) is configured to receive a recovery signal 105, wherein the recovery signal 105 indicates a mitigation of the error condition (in the external device or software process) or indicates that a mitigation of the error condition (in the external device or software process) is possible.

Furthermore, the error handler 101 (the circuitry 101) is further configured to output an error condition signal 107 based on the error signal 103 in response to a reception of the error signal 103 if within a given delay time from the reception of the error signal 103, the error handler 101 (the circuitry 101) does not receive the recovery signal 105 (from the external device or software process), and otherwise omit outputting the error condition signal 107.

The error handler 101 (the circuitry 101) is configured to receive the error signal 103 and wait at least the given delay time until it provides the error condition signal 107, and provide the error condition signal 107 only if within the given delay time, no recovery signal 105 (indicating a mitigation of the error condition in the external device or software process or indicating that a mitigation of the error condition is possible) is received.

It is one idea of embodiments of the present invention that a system availability can be improved if errors or error conditions are safely managed as this is done by the error signal handling unit 100 in outputting the error condition signal 107 only if within the given delay time no recovery signal 105 is received. By this it can be achieved that a (further) external device or further software process (not shown in FIG. 1a)

which may receive the error condition signal 107 does not immediately enter a fail safe mode upon the generation of the error signal 103, if the error condition based on which the external device or software process generates the error condition 103 can be mitigated or is already mitigated. As an example the further external device may be an ECU and by having the error signal handling unit 100 between the ECU and the external device or software process it can be safely avoided that the ECU enters a fail safe mode for critical errors, as long as these errors are mitigated in the allowed given delay time.

In contrast to this, typically automotive ECUs are built in a way that critical errors always lead to entering a fail safe mode, even when these errors can be mitigated in the device having such an error. In this case, an error recovery is only possible after such an ECU enters a fail safe mode which may even lead to the case that an ECU service is stopped. Especially when thinking about electronic steering of heavy vehicles such an ECU fail safe may raise concerns of a vehicle controllability.

Hence, embodiments of the present invention enable that an ECU does not immediately enter a fail safe mode upon generation of the error signal 103, as the error condition signal 107 is only output from the error handler 101 (the circuitry 101) if within the given delay time no recovery signal 105 is received. In other words, embodiments of the present invention allow the mitigation of an error condition in an external device or software process, if this mitigation is possible and prevent an ECU from immediately entering a fail safe mode as the error condition can be mitigated or is already mitigated.

In other words, the external device or software process posting a critical error (as the error signal 103) has the option to disable it using the recovery signal 105 transmitted to the error handler 101 (circuitry 101).

As an example, the error handler 101 (the circuitry 101) may be configured to forward the error signal 103 (for example as the error condition signal 107) if within the given delay time the error handler 101 (the circuitry 101) does not receive the recovery signal 105. Furthermore, the error handler 101 (the circuitry 101) may not forward the error signal 103 if within the given delay time from the reception of the error signal 103 it does not receive the recovery signal 105. In other words, the error condition signal 107 may not only comprise information that an error happened, but may also comprise information about the device or software process that generated the error signal and also about the type of error happened in the external device or software process.

According to further embodiments, an external device or software process may generate the recovery signal only after a mitigation of the error condition in the external device or software process. Hence, in some embodiments of the present invention the error handler 101 (the circuitry 101) may be configured to receive the recovery signal 105 indicating a mitigation of the error condition in the external device or software process or, in other words, indicating that the error condition reported within the error signal 103 is not apparent anymore.

In the following it is assumed that the error handler 101 is a circuitry which is configured to receive the error signal and the recovery signal from an external device. Nevertheless in an alternate implementation of the error signal handling unit 100, the error handler 101 is a (software) process running on a processor core and the error signal 103 and the recovery signal 105 are provided by a further process which runs on the same processor (core) or on a different processor (core) as the process of the error handler 101. Hence, embodiments of the present invention also cover software-only implementations in which the error signal handler 101 is a (software) process receiving the error signal 103 and the recovery signal 105 and providing the error condition signal 107 and in which the error signal 103 and the recovery signal 105 are provided by a further (software) process. In such an implementation the error signal 103 indicates an error condition in the further process and the recovery signal 105 indicates a mitigation of the error condition in the further process or indicates that a mitigation of the error condition in the further process is possible. Hence, the following description which is provided based on a circuitry and an external device is also applicable to the above described software-only implementation in which the circuitry is replaced by a process and the external device is replaced by a further process.

Figure 1B:
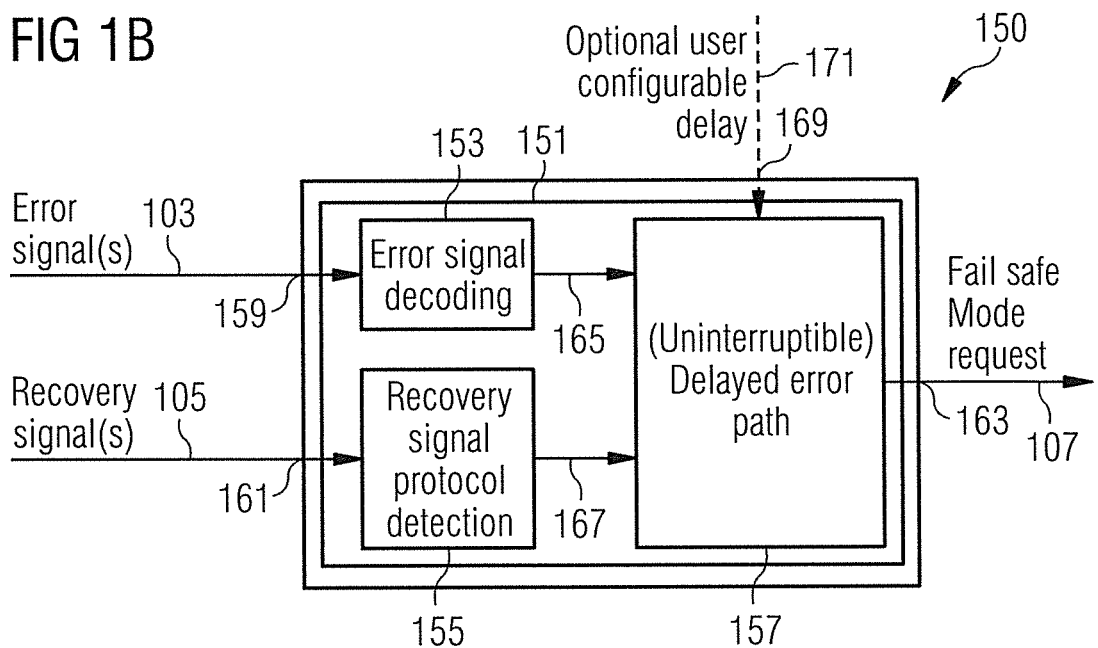
FIG. 1b shows a block schematic diagram of an error signal handling unit according to a further embodiment of the present invention.

FIG. 1b shows a block schematic diagram of an error signal handling unit 150 according to a further embodiment of the present invention. The error signal handling unit 150 differs from the error signal handling unit 100 shown in FIG. 1a in that the error signal handling unit 150 comprises a more complex circuitry 151, when compared to the circuitry 101 of FIG. 1a. This circuitry 151 may be a possible implementation of the circuitry 101 shown in FIG. 1a.

Further embodiments of the present invention may comprise some or all of the additional features of the circuitry 151, when compared to the circuitry 101.

The circuitry 151 comprises an error signal decoding stage 153, a recovery signal protocol detection stage 155 and an error condition signal generation stage 157.

According to further embodiments of the present invention, the error signal handling unit 150 may comprise a first terminal 159 configured to receive the error signal 103 or a plurality of error signals 103, a second terminal 161 configured to receive the recovery signal 105 or a plurality of recovery signals 105 and a third terminal 163 configured to output or provide the error condition signal 107 or a plurality of error condition signals 107.

In the example shown in FIG. 1b the error signal handling unit 150 is configured to receive the error signal 103 and the recovery signal 105 at the two different terminals 159, 161 (e.g. using a first communication protocol and/or communication line for the error signal 103 and using a second communication protocol and/or communication line for the recovery signal 105). Nevertheless, according to further embodiments of the present invention an error signal handling unit 150 may also comprise one terminal for receiving the error signal 103 and the recovery signal 105 (e.g. using one and the same communication protocol and/or communication line for receiving the error signal 103 and the recovery signal 105).

As an example, in a very simple embodiment in which just one bit (which can be received at this one terminal for receiving the error signal 103 and the recovery signal 105) is used for signaling the error signal 103 and the recovery signal 105, the error signal 103 may correspond to a first state of this bit at this one terminal (e.g. a high state or low state), while the recovery signal 105 may correspond to a second state of this bit at this one terminal (e.g. a low state or high state) which is different than the first state. Under a normal condition this bit would have the second state, indicating that no error is present. If an error happens the external device would change the state of this bit from the second state to the first state which corresponds to the error signal 103. The circuitry 151 may be configured to, if this bit is not changed back to the second state (which corresponds to the recovery signal 105) within the given delay time, output the error condition signal 107 and otherwise (if the bit is changed back to the second state within the given delay time) omit outputting the error condition signal 107.

An advantage of using the two different terminals 159, 161 for the error signal 103 and the recovery signal 105 is that different communication protocols can be used for the error signal 103 and the recovery signal 105, such as a not so complex one, but rather a robust protocol for the error signal 103 and a more complex protocol (but maybe not so robust) for the recovery signal 105. Thus, it can be enabled that especially error signals 103 can be reported in a robust and fast way from an external device to the error signal handling unit 150, while recovery signals 105 (which may not be as time critical as error signals 103) may use a more complex communication protocol, which enables the transmission of a larger amount of information. In other words, by using the two different terminals 159, 161 it can be achieved that even under worst conditions an error signal generated by an external device is received at the error signal handling unit 150 and may be forwarded as the error condition signal 107 to a further external device, while a corresponding recovery signal 105 may not find its way from the external device to the error signal handling unit 150 under these worst conditions. Hence, the worst thing that could happen is that the further external device enters a fail safe mode although the error condition in the external device is already mitigated. Nevertheless, this entering of the fail safe mode is still better than not entering at all a fail safe mode, e.g., when the error signal 103 does not find its way to the error signal handling unit 150 (e.g. when using a not so robust communication protocol).

As an example, the first terminal 159 receiving the error signal 103 may be one single bit line, wherein a first state of the bit line (e.g. a "high" state) indicates an error condition, while a second state of the bit line (e.g. a "low" state) indicates that no error condition is apparent in the external device. According to further embodiments, the second terminal 161 may be a so-called SPI terminal (SPI—Serial Peripheral Interface), e.g. having at least three communication lines or communication wires between the error signal handling unit 150 and the external device.

Hence, in one embodiment the communication protocols used for the error signal 103 and the recovery signal 105 may be different, and even the terminals 159, 161 for receiving the error signal 103 and the recovery signal 105 may be different from each other.

The error signal decoding stage 153 may be configured to decode the error signal 103 (received at the first terminal 159) and generate a decoded error signal 165. Furthermore, the error signal decoding stage 153 may be configured to provide the decoded error signal 165 to the error condition signal generation stage 157.

In an embodiment of the present invention, in which the error signal 103 is just a one-bit signal, the error signal decoding stage 163 may be configured to just forward this state of this one bit as the decoded error signal 165. In a more complex embodiment of the present invention, in which the error signal 103 is transmitted according to a more complex communication protocol (e.g. according to an SPI communication protocol, a CAN-communication protocol or a FlexRay-communication protocol) the error signal decoding stage 153 may be configured to decode the error signal 103 based on the communication protocol of the error signal 103.

The recovery signal protocol detection stage 155 may be configured to decode the recovery signal 105 according to a given communication protocol decoding rule (which may be different from a communication protocol decoding rule for decoding the error signal 103) to generate a decoded recovery signal 167. Especially in embodiments of the present invention which are configured to receive multiple error signals 103 (e.g. each indicating a different error condition in the external device) it may be advantageous to receive different recovery signals 105 for the different error signals 103, wherein each recovery signal 105 indicates a mitigation of a certain error condition in the external device. Hence, the decoded error signal 165 may define a specific error condition in the external device (e.g. out of a plurality of possible error conditions) and the decoded recovery signal 167 may define a mitigation of this specific error condition in the external device (e.g. out of a plurality of possible error conditions in the external device).

The error condition signal generation stage 157 may be configured to receive the decoded error signal 165 in the decoded recovery signal 167 and may be configured to generate the error condition signal 107 (for example as a fail safe mode request signal 107) based on the decoded error signal 165. The error condition signal generation stage 157 is also configured to output the error condition signal 107, if within the given delay time, the error condition signal generation stage 157 does not receive the decoded recovery signal 167 (e.g. indicating a mitigation of the specific error condition indicated by the decoded error signal 165), and otherwise omit outputting the error condition signal 107.

The error condition signal generation stage 157 may also be called an (uninterruptable) delayed error path as it delays the decoded error signal 165 (at maximum for the given delay time) before it outputs the error condition signal 107. In the case of the error signal handling unit 150 being capable of handling a plurality of error signals (e.g. for a plurality of different error conditions of the external device) the error condition signal generation stage 157 may be configured to omit outputting a first error condition signal 107 based on a first decoded error signal 165 (indicating a first error condition in the external device), if it receives within the given delay time from the reception of the first decoded error signal 165 a first decoded recovery signal 167 indicating a mitigation of this first error condition in the external device (and not of any other error condition in the external device) or indicating that a mitigation of this first error condition (and not any other error condition in the external device) is possible.

As already mentioned above, the error condition signal generation stage 157 may be configured to generate the error condition signal 107 as a fail safe mode request signal 107. Such a fail safe mode request signal 107 may be based on the error signal 103 and may indicate a request to the further external device (e.g. connected to the third terminal 163) to enter a fail safe mode. It is to be pointed out again that the entering of the fail safe mode can be prevented with the error signal handling unit 150 if the error condition based on which this fail safe mode request signal 107 may be generated is mitigated within the given delay time or if it is reported to the error signal handling unit 150 within the given delay time that this error condition can be mitigated.

Furthermore, as can be seen from FIG. 1b, the circuitry 151 (e.g. the error signal condition generation stage 157) may be configured such that the given delay time is configurable by a user. For this, the error signal handling unit 150 may comprise a fourth terminal 169 at which it receives a delay time adjust signal 171. The error condition signal generation stage 157 may be configured to adjust, upon reception of this delay time adjust signal 171 the given delay time.

According to further embodiments, it is also possible that the given delay time comprises a fixed part which is not adjustable by the user and an adjustable part, which is adjustable by the user. In other words, the circuitry 151 (e.g. the error condition signal generation stage 157) may be configured to wait before it outputs the error condition 107 at least the fixed part of the given delay time (independent of the delay time adjust signal 171) as this delay time adjust signal 171 is only used for adjusting the adjustable part of the given delay time.

In other words, the fixed part of the given delay time may define a minimum waiting time between a reception of the error signal 103 and the generation of the error condition signal 107, which can be extended based on the adjustable part of the given delay time by the user.

According to further embodiments, in which the error signal handling unit 150 is configured to handle different error signals 103 the circuitry 151 (e.g. the error condition generation stage 157) may have different delay times for different error signals 103. As an example, for not so critical error conditions in the external device the given delay times may be longer than for more critical error conditions in the external device.

As an example, the circuitry 151 may be configured to receive a first error signal indicating a first error condition in the external device and receive a first recovery signal indicating a mitigation of the first error condition or indicating that a mitigation of the first error condition in the external device is possible. The circuitry 151 may be configured to output a first error condition signal based on the first error signal in response to a reception of the first error signal if within a first given delay time from the reception of the first error signal the circuitry 151 does not receive the first recovery signal. Furthermore, the circuitry 151 may be configured to receive a second error signal indicating a second error condition in the external device (which may be different from the first error condition) and receive a second recovery signal indicating a mitigation of the second error condition or indicating that a mitigation of the second error condition in the external device is possible. The circuitry 151 may be further configured to output a second error condition signal based on the second error signal in response to a reception of the second error signal if within a second given delay time from the reception of the second error signal, the circuitry 151 does not receive the second recovery signal.

The first delay time and the second delay time may be different from each other. As an example, the first error condition may be a more critical error condition than the second error condition and therefore, the first given delay time may be shorter than the second given delay time.

According to further embodiments of the present invention, the circuitry 151 (e.g. the error condition generation stage 157) may be configured to generate the error condition signal 107 independent of the type of error signal 103 received (or in other words independent of the error condition in the external device). As an example, the circuitry 151 may generate the same error condition signal 107 for the first error signal and for the second error signal. As an example, the error condition signal 107 may use a very robust communication protocol (such as a one-bit line), wherein a high signal indicates a request for entering the fail safe mode and the low signal indicates that no error condition is present and hence, that no fail safe mode is needed. In other words, the circuitry 151 may be configured to generate the first error condition signal and the second error condition signal such that the first error condition signal is equal to the second error condition signal.

Of course, according to further embodiments of the present invention, it is also possible that the first error condition signal and the second error condition signal are different from each other, for example, the first error condition signal may comprise information about the first error condition and the second error condition signal may comprise information about the second error condition.

The circuit 151 may be designated also as an error signal delay stage 151 which is coupled between the first terminal 159, the second terminal 161 and the third terminal 163. The first terminal 159 may also be designated as the first input terminal, the second terminal 161 may also be designated as the second input terminal and the third terminal 163 may also be designated as the output terminal.

The error signal delay stage 151 is configured to provide, in response to a reception of the error signal 103 (indicating the error condition in the external device) from the external device at the first input terminal 159, the error condition signal 107 based on the error signal 103 at the output terminal 107 if within the given delay time the error signal delay stage 151 does not receive the recovery signal 105 (indicating a mitigation of the error condition in the external device or indicating that a mitigation of the error condition in the external device is possible) from the external device at the second input terminal 161, and otherwise omit outputting the error condition signal 107.

FIG. 2a shows a block schematic diagram of a device 200 according to an embodiment of the present invention. The device 200 may be, for example, an external device which is configured to get connected to the error signal handling unit 100 shown in FIG. 1a and/or to the error signal handling unit 150 shown in FIG. 1b.

As an example, the external device 200 may be a so-called MCU (MCU—Microcontroller), which generates, upon a detection of an error condition in the device 200, an error signal 103 and which is further configured to generate a recovery signal 105 if the error condition in the device 200 is mitigated or if the error condition in the device 200 can be mitigated.

In other words, the device 200 is configured to output in response to an error condition in the device 200 the error signal 103 indicating the error condition, and output in response to a mitigation of the error condition or if a mitigation of the error condition is possible, the recovery signal 105 indicating the mitigation or the possibility of mitigation of the error condition.

Hence, the device 200 may be configured to detect if an error condition is apparent in the device 200 and may upon a detection of such an error condition output the error signal 103. Furthermore, the device 200 may be configured to determine if an error condition in the device 200 can be mitigated or fixed and output the recovery signal 105 if the error condition is mitigated or fixed or if the device 200 detected that the error condition can be mitigated or fixed.

According to further embodiments of the present invention, the device 200 may comprise a first terminal 201 for providing the error signal 103 and a second terminal 203 for providing the recovery signal 105. As an example, the device 200 may be configured to output the error signal 103 (at the first terminal 201) according to a first communication protocol and the recovery signal 105 (at the second terminal 203) according to a second communication protocol, wherein the first communication protocol and the second communication protocol may be different.

As already mentioned in conjunction with the error signal handling unit 150 the first communication protocol for the error signal 103 may be a more robust protocol than the second communication protocol for the recovery signal 105, e.g. such that a loss of the error signal 103 even under worst conditions is much more unlikely than a loss of the recovery signal 105.

As an example, the first terminal 201 may be compatible with the first terminal 159 of the error signal handling unit 150 and the second terminal 203 may be compatible with the second terminal 161 of the error signal handling unit 150. As an example, the first terminal 201 may be a single pin (e.g. if the error signal 103 is transmitted using just one signal line) while the second terminal 203 may be a more complex terminal (comprising a plurality of different pins or contacts), e.g., such as an SPI terminal, CAN terminal or FlexRay terminal.

According to further embodiments the first terminal 103 may be a more complex one (e.g. comprising more than one pin or contact) too, e.g., such as an SPI terminal, CAN terminal or FlexRay terminal.

According to further embodiments of the present invention a device may be configured to provide the error signal 103 and the recovery signal 105 at one common terminal (e.g. an SPI terminal), for example, using one and the same communication protocol for the error signal 103 and the recovery signal 105.

According to a further embodiment of the present invention the device 200 may be configured to detect a plurality of different error conditions in the device 200 and may be configured to generate for each error condition of the plurality of different error conditions a unique error signal 103 indicating this error condition. Furthermore, the device 200 may be configured to generate for each possible error condition of the plurality of different error conditions a unique recovery signal 105 indicating a mitigation or the possibility of mitigation of this error condition in the device 200.

According to further embodiments of the present invention, the device 200 may be configured to output a qualified error recovery signal such that the device 200 has two sets of information that notifies that the error condition or the fault condition is vanished or mitigated: the recovery signal 105 and the error signal 103. As an example, after recovery (or after mitigation of the error condition) the error signal 103 can be released or reset under hardware control if the intended (recovery) events took place and the recovery signal 105 can be seen as an additional confirmation from the software. In other words, the error signal 103 together with the recovery signal 105 may be designated as a qualified recovery signal, wherein the external device 200 may be configured to reset the error signal 103 after a mitigation of the error condition, indicating that no error condition is apparent anymore in the external device 200 and additionally provide the confirmation that the error condition is mitigated by means of the recovery signal 105.

An error signal handling unit (e.g. the error signal handling unit 100 or 150) may be configured to omit outputting the error condition signal 107 only if it receives within the given delay time from the reception of the error signal 103 this qualified recovery signal (which is based on a reset of the error signal 103 and on the confirmation of the mitigation of the error condition by means of the additional recovery signal 105).

In contrast to this and according to further embodiments, as already described, the device 200 may be configured to provide the error signal 103 and the recovery signal 105 such that the recovery signal is formed by a reset of the error signal 103. In this case the device 200 may be configured to provide the error signal 103 and the recovery signal 105 at one and the same terminal.

FIG. 2b shows an example implementation of the device 200 together with the error signal handling unit 100 (which can be also designated as an external safety monitor). The device 200 comprises a plurality of process handlers 201a to 201n and an internal safety monitor 203. The internal safety monitor 203 is configured to propagate a detected error condition (e.g. as an internal error event broadcast 205) to the plurality of process handlers 201a to 201n. Furthermore, each of the process handlers 201a to 201n is configured to perform an error routine in response to the received error condition 205. The internal safety monitor 203 is configured to output the recovery signal 105 based on results of the error routines performed by the process handlers 201a to 201n upon reception of the error condition 205.

To summarize the above, the External Error Event (the error signal 103) that is transmitted to the error signal handling unit 100 is also broadcast to all the process handlers 201a to 201n. As an example such a process handler 201a to 201n can be a (software) process 201a to 201n. Different such software processes could be executed on different processor cores (e.g. even of different (embedded) processors) but also on one and the same processor (e.g. even on the same processor core of this processor).

Each process handler (e.g. each software process or processor) 201a to 201n is statically programmed to execute a dedicated action (software program or software routine—the error routine) upon reception of the internal error event broadcast 205. This enables the implementation of an N-Variant error handling.

At least one of the process handlers 201a to 201n (or processors) can be statically programmed to perform a voting among the results of the other process handlers 201a to 201n (or processors). This processor is configured to control the safe state by a dedicated interface (typically several pins) and enables a safe reliable recovery, for example, by providing a recovery possible signal 207 to the internal safety monitor 203, which then generates the recovery signal 105.

Such a scheme enables the system to reduce the responsibility of the Error Signal Handling Unit 100 to control the safe state (i.e. to generate the error condition signal 107) only when global faults affecting all processors or process handlers 201a to 201b happen. In the other situations a SW recovery triggered by the Error Event is possible (e.g. using a recovery handler 215). The ability to run multiple recovery programs and making a vote enables the system to detect situations where M out of the N processors or process handlers 201a to 201n are not operational.

The same principle could be applicable to multiple threads. A given number of threads (T) are activated in several Processors (N with N=<T).

Furthermore, the device 200 comprises a safe state control interface 209 to which the internal error event broadcast 205 is also forwarded and which automatically indicates a faulty state.

Hence in the safety-related system shown in FIG. 2b there are two ways or two channels that can control the safe state (e.g. generate the error condition signal 107).

One is application-independent and automatically managed by dedicated Hardware and Software elements. This is realized by the internal safety monitor 203 and the error signal handling unit 100.

The other is an application-dependent safe state control, where the application detects a situation that has the potential to violate a safety goal. For instance an external sensor delivers a wrong information: the application or the device 200 monitors this sensor with a second one, and if a mismatch between these two sensors is observed, the application or the device 200 may decide to enter a dedicated safe-state (generate the error condition signal 107). This is performed via the safe state control interface 209. In this case the internal safety monitor 203 does not report an error because there is no hardware fault present in the microcontroller or (safety) device 200.

Furthermore, the device 200 can comprise several hardware or software monitors 210 which are configured to monitor the process handlers 201a to 201n and which are configured to generate an error message 211 in response to which the internal safety monitor generates the error signal 103. In other embodiments of the device 200, these hardware or software monitors 210 could be omitted and the internal safety monitor 203 itself performs the monitoring of the process handlers 201a to 201n. Furthermore these hardware or software monitors 210 can be configured to monitor further hardware components 213 (which may even be external to the device 200).

Furthermore, the internal safety monitor 203 is configured to output the recovery signal 105 if at least for a given number of the process handlers 201a to 201n results of the error routines performed by this given number of process handlers 201a to 201n correspond to expected results and otherwise omit outputting the recovery signal 105. In other words, a voting is performed based on which the internal safety monitor 203 generates the recovery signal 105. As already described, this voting can be performed by one of the process handlers (e.g. a process handler 201a) or even by the internal safety monitor 203 itself.

As an example, the voting can be a software program that expects at least M out of N (M<N) identical results from N independent software programs (or error routines) performed by the process handlers 201a to 201n. This N software programs are responsible to evaluate the error situation and tell if they accept the recovery. Typically each of the N software programs will use a "different" algorithm to make their own assessment of the fault situation. Hence, the process handlers 201a to 201n are configured such that error routines performed by different process handlers 201a to 201n of the plurality of process handlers 201a to 201n are different from each other in one embodiment.

In a further embodiment, the internal safety monitor 203 is configured to output the recovery signal 105 if at least a result of one of the error routines performed by the process handlers 201a to 201n corresponds to an expected result and otherwise omit outputting the recovery signal 105.

As already mentioned above, the process handlers 201a to 201n can be software processes running on different processor cores.

Furthermore, the device 200 comprises the recovery handler 215. The recovery handler 215 is configured to perform a recovery routine on the process handlers 201a to 201n for which a result of the error routine performed by these process handlers 201a to 201n does not correspond to an expected result. Hence, the device 200 can perform a self-recovery. In such cases, in which the self-recovery is possible or was already successful performed, the internal safety monitor 203 generates the recovery signal 105.

FIG. 3a shows a block schematic diagram of an error signal handling system 300 according to a further embodiment of the present invention.

The error signal handling system 300 comprises the external device 200 shown in FIG. 2a or FIG. 2b and the error signal handling unit 100 shown in FIG. 1a. Hence, the explanations provided for the error signal handling unit 100 and the external device 200 also apply to the error signal handling system 300.

As can be seen, the (external) device 200 is connected to the error signal handling unit 100.

In other words the error signal handling unit 100 is configured to receive the error signal 103 and the recovery signal 105 from the external device 200 and output, based on a reception of the error signal 103 from the external device 200 the error condition signal 107 if it does not receive within the given delay time from the reception of the error signal 103 the recovery signal 105 from the external device 200.

To summarize, FIG. 3a shows the error handling system 300 comprising the device 200 configured to output in response to an error condition in the device 200 the error signal 103 indicating the error condition, and output in response to a mitigation of the error condition or if a mitigation of the error condition is possible the recovery signal 105 indicating the mitigation or the possibility of mitigation of the error condition. Furthermore, the error signal handling system 300 comprises the error signal handling unit 100 comprising the error handler circuitry 101 configured to receive the error signal 103 and the recovery signal 105 from the device 200. The circuitry 101 is configured to output the error condition signal 107 based on the error signal 103 in response to a reception of the error signal 103 if within the given delay time from the reception of the error signal 103, the circuitry 101 does not receive the recovery signal 105 and otherwise omit outputting the error condition signal 107.

The device 200 may be external to the error handling system 100.

As an example, the device 200 may comprise a first substrate (or may be arranged on a first substrate) which is placed apart from a second substrate of the error signal handling unit 100 (e.g., in which the error signal handling unit 100 is arranged).

The device 200 may be connected to the error signal handling unit 100, for example, by means of one or more wires for transmitting the error signal 103 and/or the recovery signal 105.

FIG. 3b shows a block schematic diagram of an error signal handling system 350 according to a further embodiment of the present invention.

The error signal handling system 350 differs from the error signal handling system 300 shown in FIG. 3a in that the error signal handling system 350 comprises the error signal handling unit 150 shown in FIG. 1b instead of the error signal handling unit 100. Furthermore, FIG. 3b shows a block schematic diagram of a further external device 352 which may be external to the error signal handling system 350 and, especially, may be no part or component of the error signal handling system 350. The device 200 (which may be external to the error signal handling unit 150) is coupled to the error signal handling unit 150, e.g., the first terminal 201 of the device 200 can be coupled to the first terminal 159 for transferring error signals 103 from the first terminal 201 of the device 200 to the first terminal 159 of the error signal handling unit 150. Furthermore, the second terminal 203 of the device 200 may be connected to the second terminal 161 of the error signal handling unit 150 for transferring the recovery signal 105 from the second terminal 203 of the device 200 to the second terminal 161 of the error signal handling unit 150. The error signal handling system 350 may be configured to provide as an output signal the error condition signal 107 or failsafe mode request signal 107, for example, to the further external device 352. If the further external device 352 receives this error condition signal 107 or failsafe mode request signal 107, the further external device 352 (which may be an ECU) may enter a failsafe mode.

As already mentioned, this entering of the failsafe mode can be prevented with the error signal handling system 350, if the error condition in the device 200 is already mitigated or can be mitigated by delaying a forwarding of the error signal 103 and by omitting an outputting of the failsafe mode request signal 107, if within the given delay time the recovery signal 105 is received.

FIG. 4 shows a flow diagram of a method 500 for outputting an error condition signal according to an embodiment of the present invention.

The method 500 comprises receiving an error signal (e.g. from an external device or software process) indicating an error condition (e.g. in the external device or software process) at 501.

Furthermore, the method 500 comprises outputting an error condition signal based on the error signal in response to reception of the error signal if within a given delay time from the reception of the error signal no recovery signal indicating a mitigation of the error condition (e.g. in the external device or software process) or indicating that a mitigation of the error condition in the external device is possible is received and otherwise omitting outputting the error condition signal at 503.

Some aspects of embodiments of the present invention will be summarized in the following.

Embodiments of the present invention provide a new approach for safely managing errors in order to improve a system availability. Further embodiments of the present invention allow an ECU to safely avoid entering into failsafe for critical errors as long as this error is mitigated in the allowed (given) delay time.

Typically automotive ECUs are built in a way that a critical error always leads to an entering of the failsafe mode, such that an error recovery is possible only after this. Hence, it is still an issue that the ECU service was stopped. But what was acceptable in the past is no longer acceptable now, for example, electronic steering now reaching heavy vehicles where an ECU failsafe may raise concerns about vehicle controllability.

Hence, embodiments of the present invention solve this issue by providing a mechanism/method to safely prevent entry into failsafe mode as soon as an error is detected.

As can be seen from FIGS. 3a and 3b such an error signal handling mechanism can be based on two paths: the error path (e.g., one or two signals) used to report that an error has been detected by an external component (e.g., by the external device 200, for example an MCU) and the recovery path used to disable the failsafe mode entry.

Some embodiments of the present invention have the following features:

A circuitry (e.g., the circuitry 101 or 151) is implemented to detect that a new error condition has been posted by an external circuitry (e.g., by the external device 200).

A user configurable delay unit (e.g., the error condition signal generation stage 157) is configured to delay this error condition (or the error signal 103) so that it cannot force entry into failsafe mode as long as the (given) delay time has not expired.

An error recovery path (e.g., inside the error condition signal generation stage 157) is configured to block the error propagation in the delay unit as long as the error recovery is done by the end of the user defined (given) delay time, or in other words, as long as the error condition in the external device 200 is mitigated before the end of the given delay time.

Embodiments of the present invention may be configured to support repetitive errors from the external circuitry as already described.

In an implementation example of embodiments of the present invention (e.g., shown in FIG. 3b) the error signal 103 may be comprised of one or two signals, wherein an error is reported during a known time. Recovery signals 105 may use a robust protocol, for example a SPI protocol with a specific command. The circuitry 151 may be implemented in an external device to the MCU (e.g., to the device 200).

Embodiments of the present invention delay a critical error signal in order to allow a transaction using different signals (the recovery signals 105) to postpone an error mode entry. This is different to known embedded systems in which critical errors always lead to entering into failsafe. Hence, the delaying of a critical error is a paradigm which is broken by embodiments of the present invention.

According to some embodiments (e.g., according to the embodiment shown in 3b) a protocol between two devices (e.g., between the device 200 and the error signal handling unit 150) may be defined so that the one (the device 200) posting a critical error (e.g., in the form of the error signal 103) then has the option to disable it using a robust command (e.g., the recovery signal 105) to the other device (to the error signal handling unit 150).

The method 500 may be supplemented by any of the features and functionalities described herein with respect to the apparatus, and may be implemented using the hardware components of the apparatus.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital non-transitory storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

The invention claimed is:

1. An error signal handling unit, comprising:
an error handler comprising at least partially hardware configured to receive an error signal indicating an error condition;
wherein the error handler is further configured to receive a recovery signal indicating a mitigation of the error condition or indicating that a mitigation of the error condition is possible; and
wherein the error handler is further configured to output an error condition signal based on the error signal in response to a reception of the error signal if within a given delay time from the reception of the error signal, the error handler does not receive the recovery signal, and otherwise omit outputting the error condition signal.

2. The error signal handling unit according to claim 1, wherein the error handler is further configured to forward the error signal as the error condition signal if within the given delay time the error handler does not receive the recovery signal.

3. The error signal handling unit according to claim 1, wherein the error handler is further configured to decode the error signal and generate the error condition signal based on the decoded error signal.

4. The error signal handling unit according to claim 1, wherein the error handler is further configured to decode the recovery signal according to a given communication protocol decoding rule.

5. The error signal handling unit according to claim 4, wherein the error handler is further configured to decode the error signal according to a further communication protocol decoding rule which is different than the communication protocol decoding rule.

6. The error signal handling unit according to claim 1, wherein the error handler comprises:
a first input terminal configured to connect to an external device providing the error signal and the recovery signal and receive the error signal; and
a second input terminal configured to connect to the external device and receive the recovery signal.

7. The error signal handling unit according to claim 1, wherein the error handler is further configured to generate a fail safe mode request signal based on the error signal indicating a request to an external device or a further external device to enter a fail safe mode and output the fail safe mode request signal as the error condition signal.

8. The error signal handling unit according to claim 1, wherein the error handler is further configured to vary the given delay time based on a delay time adjust signal.

9. The error signal handling unit according to claim 1, wherein the given delay time comprises a fixed part which is not adjustable and an adjustable part which is adjustable by a received delay time adjust signal.

10. The error signal handling unit according to claim 1,
wherein the error handler is further configured to receive a further error signal indicating a further error condition and receive a further recovery signal indicating a mitigation of the further error condition or indicating that a mitigation of the further error condition is possible; and
wherein the error handler is further configured to output a further error condition signal based on the further error signal in response to a reception of the further error signal if within a further given delay time from the reception of the further error signal, the error handler does not receive the further recovery signal.

11. The error signal handling unit according to claim 10, wherein the further given delay time is different from the given delay time.

12. The error signal handling unit according to claim 10, wherein the error handler is configured to generate the error condition signal and the further error condition signal such that the error condition signal is equal to the further error condition signal.

13. The error signal handling unit according to claim 1, wherein the error handler comprises:
an error signal decoding stage configured to decode the error signal and generate a decoded error signal in response thereto;
a recovery signal protocol detection stage configured to decode the recovery signal according to a given communication protocol decoding rule and generate a decoded recovery signal; and
an error condition signal generation stage configured to generate the error condition signal based on the decoded error signal and output the error condition signal if within the given delay time, the error condition signal generation stage does not receive the decoded recovery signal, and otherwise omit outputting the error condition signal.

14. The error signal handling system according to claim 1, wherein the error handler comprises circuitry.

15. The error signal handling system according to claim 1, wherein the error handler is configured to receive the error signal from an external device, wherein the error signal indicates an error condition in the external device; and
wherein the error handler is further configured to receive the recovery signal from the external device, wherein the recovery signal indicates a mitigation of the error condition in the external device or indicates that a mitigation of the error condition is possible in the external device.

16. The error signal handling unit according to claim 1, wherein the error handler is a process running on a processor; and
wherein the error signal and the recovery signal are provided by a further process running on the same processor or a different processor as the error handler process.

17. The error signal handling unit according to claim 16, wherein the error signal indicates an error condition in the further process; and
wherein the recovery signal indicates a mitigation of the error condition in the further process or indicates that a mitigation of the error condition is possible in the further process.

18. The error signal handling unit according to claim 16, wherein the process and the further process run on the same processor core.

19. A device configured to output, in response to an error condition in the device, an error signal indicating the error condition, and output, in response to a mitigation of the error condition or if a mitigation of the error condition is possible, a recovery signal indicating the mitigation or the possibility of mitigation of the error condition.

20. The device according to claim 19, further configured to output the error signal according to a first communication protocol and the recovery signal according to a second communication protocol, wherein the first communication protocol and the second communication protocol are different.

21. The device according to claim 19,
wherein the device comprises a plurality of process handlers and a safety monitor;
wherein the safety monitor is configured to propagate the error condition to the plurality of process handlers; and
wherein each process handler is configured to perform an error routine in response to the received error condition; and
wherein the safety monitor is configured to output the recovery signal based on results of the error routines performed by the process handlers.

22. The device according to claim 21, wherein the safety monitor is configured to output the recovery signal if at least a predetermined number of the process handlers results of the error routines performed by this given number of process handlers correspond to expected results and otherwise omit outputting the recovery signal.

23. The device according to claim 21, wherein the safety monitor is configured to output the recovery signal if at least a result of one of the error routines performed by the process handlers corresponds to an expected result and otherwise omit outputting the recovery signal.

24. The device according to claim 21, wherein the process handlers are configured such that error routines performed by different process handlers of the plurality of process handlers are different from each other.

25. The device according to claim 21, wherein the process handlers are software processes running on different processor cores.

26. The device according to claim 21, further comprising:
a recovery handler configured to perform a recovery routine on the process handlers for which a result of the error routine performed by these process handlers does not correspond to an expected result.

27. An error signal handling system, comprising:
a device configured to output, in response to an error condition in the device, an error signal indicating the error condition, and output, in response to a mitigation of the error condition or if a mitigation of the error condition is possible, a recovery signal indicating the mitigation or the possibility of mitigation of the error condition; and
an error signal handling unit comprising an error handler configured to receive the error signal and the recovery signal from the device;
wherein the error handler is further configured to output an error condition signal based on the error signal in response to a reception of the error signal if within a given delay time from the reception of the error signal, the error handler does not receive the recovery signal and otherwise omit outputting the error condition signal.

28. The error signal handling system according to claim 27, wherein the device comprises a first substrate which is spaced apart from a second substrate of the error signal handling unit.

29. An error signal handling unit comprising:
a first input terminal;
a second input terminal;
an output terminal; and
an error signal delay stage coupled between the first input terminal, the second input terminal and the output terminal;
wherein the error signal delay stage is configured to provide, in response to a reception of an error signal from an external device at the first input terminal indicating an error condition in the external device, an error condition signal based on the error signal at the output terminal if within a given delay time, the error signal delay stage does not receive a recovery signal from the external device at the second input terminal indicating a mitigation of the error condition in the external device or indicating that a mitigation of the error condition in the external device is possible, and otherwise omit outputting the error condition signal.

30. A system, comprising:
means for outputting an error condition signal;
means for receiving an error signal indicating an error condition; and
means for receiving a recovery signal indicating a mitigation of the error condition or indicating that a mitigation of the error condition is possible,
wherein the means for outputting the error condition signal is further configured to output an error condition signal based on the error signal in response to a reception of the error signal if within a given delay time from the reception of the error signal, the means does not receive the recovery signal and otherwise omit outputting the error condition signal,
wherein at least one of the error condition signal outputting means, the error signal receiving means, and the recovery signal receiving means comprises at least partially hardware.

31. An error signal handling unit, comprising:
an error signal decoding stage configured to receive an error signal indicating an error condition, decode the error signal, and generate a decoded error signal in response thereto;
a recovery signal protocol detection stage configured to receive a recovery signal indicating a mitigation of the error condition or indicating that a mitigation of the error condition is possible, decode the recovery signal according to a given communication protocol decoding rule, and generate a decoded recovery signal; and
an error condition signal generation stage configured to generate a fail safe mode request signal based on the decoded error signal, wherein the fail safe mode request signal indicates a request to an external device to enter a fail safe mode, and output the fail safe mode request signal as an error condition signal if within a given delay time from a reception of the decoded error signal, the error condition signal generation stage does not receive the decoded recovery signal, and otherwise omit outputting the fail safe mode request signal,
wherein at least one of the error signal decoding stage, the recovery signal protocol detection stage, and the error condition signal generation stage comprises at least partially hardware.

32. A method for outputting an error condition signal, the method comprising:
receiving an error signal indicating an error condition at an error handler component; and
outputting an error condition signal at the error handler component based on the error signal in response to a reception of the error signal if within a given delay time from the reception of the error signal no recovery signal indicating a mitigation of the error condition or indicating that a mitigation of the error condition is possible is received, and otherwise omitting outputting the error condition signal.

33. A non-transitory storage medium having stored thereon a computer program having a program code for performing, when running on a computer, a method for outputting an error condition signal, the method comprising:
receiving an error signal indicating an error condition at an error handler component; and
outputting an error condition signal at the error handler component based on the error signal in response to a reception of the error signal if within a given delay time from the reception of the error signal no recovery signal indicating a mitigation of the error condition or indicating that a mitigation of the error condition possible is received and otherwise omitting outputting the error condition signal.

* * * * *